United States Patent Office 3,567,675
Patented Mar. 2, 1971

3,567,675
ELECTROSTATIC SPRAYING OF ALUMINUM PIGMENTED PAINT
John W. Merck, Tyrone, Pa., and Lester L. Spiller, Indianapolis, Ind., assignors to Ransburg Electro-Coating Corp., Indianapolis, Ind.
No Drawing. Continuation-in-part of application Ser. No. 453,508, May 5, 1965, which is a continuation-in-part of application Ser. No. 125,933, July 24, 1961. This application Aug. 30, 1966, Ser. No. 575,953
The portion of the term of the patent subsequent to Oct. 5, 1982, has been disclaimed
Int. Cl. C08f 41/28
U.S. Cl. 260—33.6     7 Claims

ABSTRACT OF THE DISCLOSURE

When aluminum flakes are treated with aqueous treating agents in order to provide them with an insulating coating to assist electrostatic atomization, the water left by the aqueous agent is troublesome as is known. The treated flakes are washed with water miscible polar organic solvent to remove the water and then with a hydrocarbon solvent to remove the polar solvent, and the flakes are then dispersed in a coating composition in order that electrostatic atomization may proceed with minimum danger of arcing.

---

The present application is a continuation-in-part of our prior copending application Ser. No. 453,508, filed May 5, 1965, now abandoned, which, in turn, is a continuation-in-part of our prior application Ser. No. 125,933, filed July 24, 1961, now U.S. Pat. No. 3,210,316.

The present invention is directed to the application of aluminum-pigmented coating compositions utilizing electrostatic atomization of storage-stable coating compositions.

The application of electrostatic atomization to aluminum-pigmented coating compositions has been a matter of considerable difficulty since the suspended aluminum tends to short-circuit the electrostatic potential used for atomization (arcing). This is especially troublesome when the organic solvent medium of the paint includes polar solvents which increase the conductivity of the solvent medium and the danger of troublesome arcing.

In order to deal with the aluminum pigment, it is necessary to coat this pigment with a thin layer of an insulating material. This can be effected while the aluminum pigment is in an organic solvent medium by building an organic polymer coating thereon, but these polymer coatings tend to degrade the metallic luster of the aluminum, making the aluminum pigment less attractive and therefore, less useful. On the other hand, when aqueous treatments are used to apply an insulating coating, then the water forming part of the aqueous treatment generates difficulties since, and as is known, the aluminum is reactive with traces of water in a paint to generate gas causing trouble on storage.

Despite the trouble caused by the association of the aluminum pigment with water, the aqueous treatments have much to commend them since they do not significantly degrade the metallic luster of the aluminum.

It is possible to wash the water-wet treated aluminum flakes with a water-miscible organic solvent in order to remove the water and eliminate the gassing problem, but the polar solvents needed for this process defeats the electrostatic atomization purpose which is the basis for the aqueous treatment initially contemplated. This is because the polar solvents needed to remove the water tend to increase the conductivity of the hydrophobic organic solvent medium of the paint making the insulating coating on the aluminum flakes less effective to overcome the arcing problem.

Accordingly, the invention proposes to treat the aluminum flakes using an aqueous treatment in order to form thereon an insulating coating. Thereafter, the flakes are washed with a water-miscible polar organic solvent, and especially acetone or other water-miscible ketone. Since the ketone-washed flakes are not helpful to the intended electrostatic atomization, these ketone-associated flakes are then washed with a non-polar hydrocarbon solvent, especially aromatic hydrocarbon solvents such as xylene, toluene and liquid homologs thereof. In this way, the flakes become associated with hydrocarbon solvents and the polar ketone solvents are substantially eliminated to provide an aluminum-pigmented paste of insulated aluminum particles (which have been insulated by aqueous treatment) and which can be incorporated into hydrophobic organic solvent solution coating compositions in which the solvent medium consists essentially of non-polar organic solvents to pigment the same.

It is of interest to note that the treated aluminum flakes in accordance with the invention are more sensitive to agglomeration than the untreated aluminum flakes and "arcing" occurs when the aluminum flakes agglomerate to form a conductive path. It is this increased tendency to agglomerate which makes it impractical to dry the solvent-wet aluminum flakes which may be produced in accordance with the invention, and it also makes it somewhat surprising that these flakes are more resistant to arcing when the electrostatic potential is applied.

Referring more particularly to the procedure which is followed in accordance with the invention the aluminum flake pigment is separated from the aqueous treating solution such as the 0.05% aqueous sodium fluosilicate solution of our said patent, as by filtration or centrifuging, but such mechanical separation is not adequate to remove the last traces of moisture as previously indicated. Accordingly, the pigment is then washed with water miscible solvent, e.g., acetone, and preferably washed twice, with one and one-half to two times its weight of acetone. Following the acetone wash, the acetone is removed by thorough washing with a water-free non-polar solvent such as xylol, mineral spirits, or other hydrocarbon which is a thinning ingredient of the vehicle in which the pigment is to be suspended.

The use of water-miscible ketones, as previously noted, is particularly preferred, but other water-miscible organic solvents can be used, especially water-miscible esters illustrated by ethyl formate, methyl formate and methyl acetate.

Of least utility, though still broadly useful, are alcohols such as methyl and ethyl alcohols. The higher alcohols have reduced water miscibility, but there is very little water to remove, so the various propanols and butanols may be used.

The invention is illustrated by the following.

EXAMPLE I

In the preferred method of treating aluminum flakes, a commercial form of non-leafing flake-aluminum paste, such as the MD 787 grade marketed by Metals Disintegrating Co. or the Alcoa 226 grade marketed by Aluminum Company of America, is employed as a starting material. Such pastes contain approximately 65% of flake aluminum and about 35% mineral spirits, with the aluminum flakes having been treated with a small proportion of oleic or other fatty acid to control leafing properties. As a first step in the processing treatment, the paste is washed with acetone to remove fatty acid in order to condition the pigment for subsequent treatment with aqueous solutions; and after the washing, the acetone is removed, as by filtering or centrifuging. The washed pigment is then mixed with several times its weight of a 3% (by weight) solution of sodium bicarbonate in water, and the mixture stirred vigorously for ten minutes, after which the mix is allowed to stand for 55 minutes, with occasional stirring for a total reaction time of 65 minutes. This reaction, which may be carried out at room temperature, provides a thin oxide film on the aluminum flakes. If desired, a wetting agent, such as one of fluoro-chemical type, may be incorporated in the sodium bicarbonate solution to reduce the amount of agitation required in the production of the desired reaction.

After completion of the oxidizing reaction, the oxidized flakes are separated from the sodium bicarbonate solution, as by filtering or centrifuging, and then added to a 0.05% solution of sodium fluosilicate in water. The quantity of sodium fluosilicate solution employed is desirably about seven times the weight of the oxidized pigment. After about 15 minutes with occasional stirring, the pigment is separated from the solution, as by filtering or centrifuging, and then washed, preferably twice, with one and one-half to two times its weight of acetone. Following the acetone wash, the acetone is removed by thorough washing with a water-free non-polar solvent such as xylol, mineral spirits, or other hydrocarbon which is a thinning ingredient of the vehicle in which the pigment is to be suspended.

Pigment treated as above described, when suspended in an appropriate vehicle having electrical insulating characteristics, produces a paint which is electrically non-conductive and which does not become objectionably conductive under conditions of electrostatic atomization, even if the pigment content is as high as 24 ounces per gallon. One suitable vehicle for a pigment treated as above described consists of approximately 28% alkyd resin (100% solids), 14.5% urea-formaldehyde resin (100% solids) in xylol, 57% solvents, and 0.5% amine additive.

EXAMPLE II

A further preferred illustration of the invention is begun by washing 1 part by weight of non-leafing flake-aluminum paste containing about 65% flake oleic acid-treated aluminum and about 35% mineral spirits with 2 parts by weight of methyl isobutyl ketone to remove the oleic acid. Residual methyl isobutyl ketone is removed by filtration and the acid-freed aluminum flakes are mixed with three times their weight of a 3% by weight aqueous sodium bicarbonate solution desirably containing a fluorochemical wetting agent. After 10 minutes of vigorous stirring, the mixture is allowed to stand for 55 minutes at room temperature to condition the flakes with a thin oxide film.

The aluminum flakes with oxide film thereon are separated from the bulk of the aqueous bicarbonate solution by centrifuging the mixture and the separated flakes are then added to seven parts by weight of a 0.05% solution of sodium fluosilicate in water for each part by weight of the flakes. After 15 minutes of contact with occasional stirring, the flakes are separated from the bulk of the aqueous treating agent by centrifuging and the separated flakes moist with residual water are washed twice their weight of methyl isobutyl ketone to remove the water. The ketone-washed flakes are then washed with twice their weight of xylol to provide a product composed of the treated aluminum flakes wet with residual xylol.

These flakes are then dispersed in a vehicle composed of a soya oil-modified phthalic alkyd of medium oil length and urea-formaldehyde resin in a solvent medium containing xylol as the main component. More particularly, 28 parts of the alkyd resin and 14.5 parts of the urea-formaldehyde resin are combined with 57 parts of xylol and 0.5 part of 2-amino-2-methyl-1-propanol. The vehicle is pigmented with the aluminum flake treated as indicated hereinbefore in amounts as high as 24 ounces of aluminum flake per gallon. The pigmented vehicle is stable on storage in closed containers despite the association of the aluminum flakes with aqueous treating agents during the treatment described herein and possesses greatly reduced arcing tendency when electrostatically atomized.

EXAMPLE III

Example II is repeated precisely using methyl ethyl ketone in place of methyl isobutyl ketone. The same results are obtained. In both the present example and also in Example II, the use of higher boiling ketones reduces the danger of the treatment as compared with Example I.

The invention is defined in the claims which follow.

We claim:

1. In the electrostatic atomization of aluminum-pigmented coating composition, the improvement comprising incorporating into a coating composition comprising an organic solvent medium consisting essentially of hydrocarbon solvents, aluminum flakes which have been treated with an aqueous treating agent in order to form an insulating coating thereon and then washed, first with water-miscible polar organic solvent to remove water therefrom, and then with hydrocarbon solvent to remove the polar solvent therefrom, and then passing a unidirectional electrostatic potential through an increment of said coating composition to atomize the same.

2. A method as recited in claim 1 in which said water-miscible polar solvent is a water-miscible ketone.

3. A method as recited in claim 1 in which said ketone solvent is acetone.

4. A method as recited in claim 1 in which said hydrocarbon solvent is an aromatic hydrocarbon.

5. A method as recited in claim 1 in which said aluminum-pigmented coating composition is stored in a container prior to use.

6. A method as recited in claim 1 in which said aluminum flakes are washed with acetone and then with xylol.

7. A closed container containing a stable aluminum-pigmented coating composition particularly adapted to be applied utilizing electrostatic atomization, said coating composition comprising an organic solvent medium consisting essentially of hydrocarbon solvents and having aluminum flakes dispersed therein, said aluminum flakes including aluminum oxide thereon and having an electrically insulating coating thereon deposited from an aqueous treating agent, said insulated aluminum flakes being washed, first with a substantially inert water-miscible polar organic solvent to remove water therefrom, and then with hydrocarbon solvent to remove said substantially inert polar solvent therefrom before being dispersed in said coating composition.

References Cited

UNITED STATES PATENTS

| | | | |
|---|---|---|---|
| 1,866,017 | 7/1932 | De Stubner | 106—290 |
| 3,181,962 | 5/1965 | Rolles | 106—290 |
| 3,067,052 | 12/1962 | Frieser | 106—290 |
| 3,210,316 | 10/1965 | Merck et al. | 260—39 |

FOREIGN PATENTS

| | | | |
|---|---|---|---|
| 515,263 | 8/1955 | Canada | 260—39 |

MORRIS LIEBMAN, Primary Examiner

H. H. FLETCHER, Assistant Examiner

U.S. Cl. X.R.

23—309, 312; 106—290, 291; 117—93.4; 210—66; 260—39, 40